(12) United States Patent
Fisher et al.

(10) Patent No.: US 9,695,043 B2
(45) Date of Patent: Jul. 4, 2017

(54) FUEL UNIT, GAS GENERATOR AND SYSTEM

(71) Applicant: Intelligent Energy Inc., San Jose, CA (US)

(72) Inventors: Allison M. Fisher, Valley City, OH (US); Guanghong Zheng, Westlake, OH (US); Jason L. Stimits, Avon, OH (US); Chad E. Law, Milan, OH (US); Russell H. Barton, New Westminster (CA); Richard A. Langan, Parma, OH (US); Thomas J. Kmetich, Willoughby Hills, OH (US); Gerald A. Zsigo, North Ridgeville, OH (US)

(73) Assignee: Intelligent Energy Inc., San Jose, CA (US)

( * ) Notice: Subject to any disclaimer, the term of this patent is extended or adjusted under 35 U.S.C. 154(b) by 127 days.

(21) Appl. No.: 14/676,393

(22) Filed: Apr. 1, 2015

(65) Prior Publication Data

US 2015/0203353 A1   Jul. 23, 2015

Related U.S. Application Data

(63) Continuation of application No. PCT/US2013/059902, filed on Sep. 16, 2013.
(Continued)

(51) Int. Cl.
  *C01B 3/00* (2006.01)
  *B01J 19/24* (2006.01)
  *C01B 3/04* (2006.01)

(52) U.S. Cl.
  CPC ............... *C01B 3/001* (2013.01); *B01J 19/24* (2013.01); *C01B 3/04* (2013.01);
  (Continued)

(58) Field of Classification Search
  CPC combination set(s) only.
  See application file for complete search history.

(56) References Cited

U.S. PATENT DOCUMENTS

| 4,315,786 A | 2/1982 | English et al. |
| 6,979,805 B2 | 12/2005 | Arthur et al. |

(Continued)

FOREIGN PATENT DOCUMENTS

| GB | 2164637 | 3/1986 |
| JP | 2010-136417 | 6/2010 |

OTHER PUBLICATIONS

International Search Report dated Jan. 20, 2014, issued in International patent application PCT/2013/0509902.

*Primary Examiner* — Kaity Chandler
(74) *Attorney, Agent, or Firm* — Baker & Hostetler LLP (57) ABSTRACT

Disclosed is a fuel unit for a gas generator such as a hydrogen gas generator that can supply gas to a gas consuming system such as a fuel cell system. The fuel unit includes a housing containing a solid fuel composition and a heat producing material. The fuel composition contains gas releasing solid material that reacts to release gas when heated. The heat producing material reacts exothermically to produce heat. A plurality of quantities of the heat producing material are in thermal communication with corresponding portions of an unsegregated quantity the fuel composition such that, following initiation of a reaction of each quantity of the heat producing material, the quantity of heat producing material will heat the corresponding portion of the unsegregated quantity of the fuel composition, and the corresponding portion of the unsegregated quantity of the fuel composition will react to release a quantity of the gas.

16 Claims, 5 Drawing Sheets

Related U.S. Application Data (60) Provisional application No. 61/708,347, filed on Oct. 1, 2012, provisional application No. 61/715,869, filed on Oct. 19, 2012, provisional application No. 61/789,055, filed on May 22, 2013.

(52) U.S. Cl.
CPC .. *B01J 2219/00076* (2013.01); *B01J 2219/24* (2013.01); *Y02E 60/364* (2013.01)

(56) References Cited

U.S. PATENT DOCUMENTS

| | | |
|---|---|---|
| 6,989,210 B2 | 1/2006 | Gore |
| 7,235,317 B2 | 6/2007 | Delapierre |
| 7,731,491 B2 | 6/2010 | Mann |
| 8,084,150 B2 | 12/2011 | Otis et al. |
| 8,268,028 B2 | 9/2012 | Kelly et al. |
| 2003/0180587 A1 | 9/2003 | Jones et al. |
| 2003/0234172 A1 | 12/2003 | Arthur et al. |
| 2005/0142404 A1 | 6/2005 | Boucher et al. |
| 2008/0152883 A1 | 6/2008 | Miller |
| 2008/0241613 A1 | 10/2008 | Kelly et al. |
| 2010/0159343 A1 | 6/2010 | Marsh et al. |
| 2011/0033342 A1 | 2/2011 | Horiguchi |
| 2011/0177404 A1 | 7/2011 | Hung et al. |

FUEL UNIT, GAS GENERATOR AND SYSTEM

CROSS-REFERENCE TO RELATED APPLICATIONS

This patent application is a Continuation of international patent application PCT/US2013/043981 filed Jun. 4, 2013, which claims priority to Provisional patent application 61/708,347 filed Oct. 1, 2012, Provisional patent application 61/715,869 filed Oct. 19, 2012, and Provisional patent application 61/789,055 filed May 22, 2013, the disclosures of which are incorporated by reference in their entirety.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION (1) Field of the Invention

This invention relates to a fuel unit for a gas generator, the gas generator and a system including the gas generator.

(2) Description of Related Art Including Information Disclosed Under 37 CFR 1.97 and 1.98

Gas generators are used to produce a variety of gases for various purposes. Examples include hydrogen, oxygen, carbon monoxide and carbon dioxide generators. Hydrogen generators are of particular interest because they can be used to provide hydrogen gas that is used as an active material in a fuel cell battery.

Interest in fuel cell batteries as power sources for portable electronic devices has grown. A fuel cell is an electrochemical cell that uses materials from outside the cell as the active materials for the positive and negative electrode. Because a fuel cell does not have to contain all of the active materials used to generate electricity, the fuel cell can be made with a small volume relative to the amount of electrical energy produced compared to other types of batteries.

In some types of hydrogen fuel cells, hydrogen is formed from a hydrogen-containing fuel supplied to the negative electrode side of the fuel cell. In other types of hydrogen fuel cells, hydrogen gas is supplied to the fuel cell from a source outside the fuel cell.

A fuel cell system can include a fuel cell battery, including one or more fuel cells (such as in a fuel cell stack), and a gas source, such as a gas tank or a gas generator. Gas generators that supply gas to a fuel cell can be an integral part of a fuel cell system, they can be removably coupled to the fuel cell system, or they can include replaceable components containing reactants. A removable gas generator can be replaced with another one when the gas producing reactants have been consumed. Removable gas generators can be disposable (intended for only a one-time use) or refillable (intended for use multiple times) to replace consumed reactant materials.

Hydrogen generators can produce hydrogen using a variety of reactants and a variety of methods for initiating the hydrogen generating reactants. Hydrogen gas can be evolved when a hydrogen containing material reacts.

In selecting reactants for use in a hydrogen generator, consideration may be given to the following: (a) stability during long periods of time when the hydrogen generator is not in use, (b) ease of initiation of a hydrogen generating reaction, (c) the amount of energy that must be provided to sustain the hydrogen generating reaction, (d) the maximum operating temperature of the hydrogen generating reaction, and (e) the total volume of hydrogen that can be produced per unit of volume and per unit of mass of the reactant(s).

Some hydrogen containing compounds can be heated to evolve hydrogen in a chemical decomposition reaction. Such thermal decomposition reactions, such as those of hydrides, can be advantageous over hydrolysis reactions because the yield of hydrogen is greater, it does not produce steam vapor that may have to be removed from the hydrogen gas, and freezing is not a concern.

In some systems using gas produced by a gas generator, it is desirable to produce the gas on an as-needed basis, thereby minimizing the need (and the volume) to store a large quantity of gas until needed. It can also be desirable to provide the reactants for the gas generator in a replaceable, low cost form. It can also be desirable to operate the gas generator at a low cost, with a minimum amount of energy required.

In view of the above, an object of the present invention is to provide a fuel unit for a gas generator that is inexpensive and easy to manufacture, is convenient to replace, and can provide a large volume of the gas per unit volume of the fuel unit and the gas generator. It is also an object of the present invention to provide a gas generator that can be easily and inexpensively controlled to provide the gas as needed by a gas consuming system and that requires a small amount of energy to operate.

BRIEF SUMMARY OF THE INVENTION

Accordingly, one aspect of the present invention is a fuel unit for a gas generator. The fuel unit includes a housing containing a solid fuel composition and a heat producing material. The fuel composition contains a gas releasing solid material that can react to release a gas when heated. The heat producing material can react exothermically to produce heat. A plurality of quantities of the heat producing material are disposed in thermal communication with corresponding portions of an unsegregated quantity the fuel composition such that, following initiation of a reaction of each quantity of the heat producing material, the quantity of heat producing material will heat the corresponding portion of the unsegregated quantity of the fuel composition, and the corresponding portion of the unsegregated quantity of the fuel composition will react to release a quantity of the gas. Embodiments of the fuel unit can include one or any combination of the following:

each of the quantities of the heat producing material will undergo a self-sustaining exothermic reaction following initiation of the reaction thereof;

the gas-releasing solid material will not undergo a self-sustaining exothermic reaction following initiation of a gas releasing reaction;

the quantities of the heat producing material are disposed on a surface of the unsegregated quantity of the fuel composition;

the quantities of the heat producing material extend into the unsegregated quantity of the fuel composition;

the gas includes hydrogen gas; the gas can consist essentially of hydrogen gas;

the housing includes a plurality of conductive sections for conducting one of heat and electric energy through the housing; each of the conductive sections can be in thermal communication with one or more of the quantities of the heat producing material; each of the conductive sections can be in thermal communication with a single quantity of the heat producing material;

the fuel unit includes a plurality of initiators for initiating the reaction of the heat-producing material in the plurality of quantities of the heat producing material; the initiators can be disposed within the housing; the initiators can be disposed outside the housing; the initiators can include at least one thermal initiator; the initiators can include at least one electrical initiator; each of the initiators can be in thermal communication with one or more of the quantities of the heat producing material; each of the initiators can be in thermal communication with a single quantity of the heat producing material; and the fuel unit includes a plurality of the unsegregated quantities of the fuel composition; the plurality of unsegregated quantities of the fuel composition can be thermally insulated from each other.

A second aspect of the invention is a gas generator including a housing and one or more of the fuel units according to any of the embodiments disclosed in the preceding paragraph. Embodiments of the gas generator can include one or any combination of the following:

reaction of the heat producing material in the plurality of quantities of heat producing material is selectively initiated to selectively release gas from the corresponding portions of the fuel composition;

the gas generator further includes an energy source for supplying electric energy for initiation of the reaction of the quantities of heat producing material; and the gas generator includes a plurality of initiators for initiating the reaction of the heat-producing material in the plurality of quantities of the heat producing material; the initiators can include at least one thermal initiator; the initiators can include at least one electrical initiator.

A third aspect of the invention is a gas consuming system including a gas consuming device and the hydrogen generator according to any of the embodiments disclosed in the preceding paragraph. Embodiments of the gas consuming system can include one or any combination of the following:

the gas consuming device is a hydrogen fuel cell and the gas generator is a hydrogen generator;

the gas consuming system further includes an energy source for supplying electric energy for initiation of the reaction of the quantities of heat producing material; and the gas consuming system includes a control system for controlling operation of a plurality of initiators for selectively initiating the reaction of the heat-producing material in the plurality of quantities of the heat producing material to provide gas to the gas consuming device as needed.

Features, advantages and objects of the present invention will be further understood and appreciated by those skilled in the art by reference to the following specification, claims and appended drawings.

Unless otherwise specified herein, all disclosed characteristics and ranges are as determined at room temperature (20-25° C.).

DETAILED DESCRIPTION OF THE INVENTION

An embodiment of the invention is a fuel unit that can be replaceably used in a gas generator to produce gas for a gas-consuming device. In various embodiments the gas can be hydrogen, oxygen, carbon monoxide or carbon dioxide gas. A hydrogen gas generator can be part of a fuel cell system to supply the hydrogen gas as a fuel for a fuel cell battery. The fuel cell battery can include one or more fuel cells. The fuel cell system can be an integral part of an electric appliance that can be powered and/or recharged by the fuel cell battery, or the fuel cell system can be a separate device that can be connected to the electric appliance. Examples of appliances that can be supplied with power by a fuel cell system using hydrogen produced by a hydrogen generator include communications devices such as cellular telephones and smart phones; computers such as laptop and notebook computers, navigational systems such as global positioning systems, book readers, and others, particularly those with thin profiles.

The fuel unit includes a plurality of quantities of a gas-releasing solid material that can release a gas when heated. Associated with each quantity of the gas-releasing material is a quantity of heat-producing material that can react exothermically to produce sufficient heat to result in the release of the gas by the associated gas-releasing material. This can be advantageous when the energy required to initiate the exothermic reaction is less than the total amount of energy required to produce substantially all of the gas that the associated quantity of gas-releasing material is capable of providing. For convenience, the gas-releasing material is referred to below as the endo fuel, and the heat-producing material is referred to below as the exo fuel; however, these terms are intended to be interpreted broadly to include other embodiments described herein in further detail. The quantities of endo fuel can be distinct individual quantities (e.g., formed into separate solid bodies and/or segregated from each other by gaps, thermal insulation or the like), or they can be portions of a large mass, also referred to herein as unsegregated quantities, with each portion associated with a corresponding quantity of exo fuel intended to provide the heat necessary for the release of the full amount of hydrogen gas from that quantity of the unsegregated endo fuel.

The quantities of endo fuel can be arranged within the fuel unit in any suitable configuration. By arranging them in thin layers, the fuel unit can have a thin shape, either flat or curved, which can be integrated into devices or electrical appliances requiring such a shape. For example, endo fuel quantities can be arranged in a single layer. The layer can be on a substrate to maintain the quantities in the desired positions during manufacturing and use of the fuel unit. The substrate can include a portion of a package or can be an additional structure contained within the fuel unit. If the layer of endo fuel quantities has sufficient structural integrity, it can be a stand-alone subassembly in manufacturing (though a removable substrate can be used as a temporary base to support the endo fuel quantities and other components during assembly).

The plurality of endo fuel quantities can be suitably sized and shaped to fit the desired fuel unit size and shape, provide a high volume efficiency (quantity of gas per unit of volume of the fuel unit), and to provide efficient utilization of the endo fuel. For example, individual segregated quantities can have round, prismatic (e.g., square, rectangular, triangular or hexagonal) or irregular cross sections. For convenience, segregated quantities of endo fuel are referred to below as pellets, regardless of their form, shape, size or method of manufacture. Individual pellets or groups of pellets can be thermally insulated from each other to prevent heat from one pellet unintentionally initiating the production of heat and/or gas in a nearby pellet. The thermal insulation can be achieved by spacing the pellets apart and/or by disposing a material that is a poor thermal conductor around or between the pellets. Spaces and/or porous materials between, around or adjacent to the pellets can provide a gas flow passage for the gas to exit the fuel unit. Non-segregated quantities, also referred to herein as unsegregated quantities, of endo fuel can have one or more segregated quantities of exo fuel associated therewith, with the exo fuel quantities sized and located such that each exo fuel quantity can efficiently provide heat to cause the release of gas from its associated quantity of the unsegregated endo fuel.

The exo fuel and endo fuel can be associated with each other in a variety of ways, as long as energy can be provided to initiate the exothermic reaction in the exo fuel. For example, a quantity of fuel can include one or more layers of endo fuel and one or more layers of exo fuel, a quantity of endo fuel can be partially or completely coated with exo fuel, a quantity of exo fuel can be partially or completely surrounded by endo fuel, or a quantity of fuel can include an admixture of exo fuel and endo fuel. It can be advantageous for the exo fuel to be disposed as a plurality of small individual quantities in order to provide localized heating; reduce the amount of thermal insulation required around individual fuel quantities, within the fuel unit and around the fuel unit; and control the amount of gas that is available for release from the gas generator.

The fuel unit is contained in a package. The package can be flexible or rigid, or it can include both flexible and rigid components. The package can retain solid materials (e.g., loose particles of exo and endo fuels, reaction byproducts, etc.), and have a gas outlet in fluid communication with an internal gas flow path. One or more filters and/or purification units can be placed within or in fluid communication with the gas flow path and/or the gas outlet to remove solids and/or impurities from the gas. The gas outlet can be one or more openings in the package, or the fuel unit can include a valve to control the flow of gas from the fuel unit and/or reduce or prevent the flow of fluids into the fuel unit. The package will be made of materials that are able to withstand the temperatures that will produced within the fuel unit. The package can include materials that are poor thermal conductors, in order to improve energy efficiency by containing heat within the package and/or to minimize the temperature on the external surface of the package during use of the fuel unit.

The gas generator includes a plurality of initiators to initiate the exothermic reaction of the exo fuel. The initiator can be any suitable device that can provide the required energy for exo fuel initiation. For example, the initiator can be a thermal initiator that provides energy in the form of heat, or it can be an electrical initiator that provides energy in the form of electricity, depending on the type of exo fuel. The initiators can be disposed outside the fuel unit, within the fuel unit or a combination thereof.

One example of a thermal initiator is a resistive heating element. Another example of a thermal initiator is a material containing two component materials that can react exothermically upon application of a small pulse of local electrical or thermal energy. An embodiment is a laminate containing a plurality of alternating layers of the two materials. Examples are disclosed in U.S. Pat. Nos. 6,534,194 and 6,991,856 and U.S. Patent Application Publication Nos. 2008/0131316 and 2009/0235915. The layers of the two materials (designated material A and material B) can be in the form of foils, preferably nano-scale in thickness. Examples of pairs of A/B materials include Ni/Al, Ti/Al, Monel/Al, Zr/Al, Ti/B, Ti/C, Al/Fe$_2$O$_3$, Al/Cu$_2$O, Rh/Si, Ni/Si and Zr/Si. The alternating layers can be disposed on a substrate, such as a silicon or silicon-based substrate. A preferred laminate material has alternating layers of nickel and aluminum. In *Journal of Materials Science: Materials in Electronics* (2012), p. 1-5, Qiu et al. reported that a self-propagating reaction was initiated by applying a DC voltage of 1.5 volt to a nanolaminate Ni/Al film (10 μm thick). A small initiation energy (1.89 mJ) produced a large energy output (1.86 J) with a small initiation delay (0.63 s). When the material reacted, Al—Al and Ni—Ni bonds were exchanged for Al—Ni bonds. Al/Ni laminates can be obtained from Indium Corporation® (e.g., grade NF40, NF60 and NF80 NanoFoil®). Indium Corporation® also offers preforms, powders and particles that can be manufactured to specific requirements to control the heat, reaction velocity and ignition threshold.

Thermal initiators can be disposed outside the fuel unit, with heat conducted through the package, e.g., through thermally conductive areas in or thermal conductors passing through the package. In one embodiment the package can include a plurality of segments of a material with good thermal conductivity (e.g., a metal layer, foil, etc.) surrounded by material with poor thermal conductivity. In another embodiment the package can include a thermally conductive member such as a wire, pin or blade projecting inward to make contact with the endo fuel; this can be advantageous when the exo fuel is mixed with or at least partially surrounded by the endo fuel. Alternatively, thermal or electrical initiators can be disposed within the fuel unit. In such embodiments electricity to operate each initiator can be conducted through a pair of electrically conductive areas in the package in a similar manner as the conduction of heat from thermal initiators located outside the fuel unit.

In another embodiment, the exo fuel can include one or more materials that will react to produce heat when a potential is applied or when current flows through the material(s), and electrical initiators provide the voltage or current, which is conducted through electrically conductive areas in the package.

A source of energy is provided for the initiators. The energy source can be at least one or a combination of a primary battery, a secondary battery, a fuel cell, a capacitor and a public utility. The energy source can be disposed within the fuel unit, outside the fuel unit, within the gas generator, outside the gas generator, or a combination thereof. It can be advantageous for the energy source to be disposed outside the fuel unit, in order to provide the maximum quantity of gas per unit volume and/or minimize the cost of the fuel unit.

The individual quantities of exo fuel can be selectively initiated to control the amount and rate at which gas is produced in the fuel unit. This could be done manually but is preferably done automatically. In one embodiment, an electrical circuit including an X-Y grid of wires or leads can be used to enable selection of one or more initiators to be energized at a time. Such a circuit can be part of a control system, preferably disposed outside the fuel unit. The control system can determine the need for gas and control the energizing of the initiators accordingly. For example, in a hydrogen generator providing hydrogen as a fuel to a fuel cell battery, the need for hydrogen and/or the required hydrogen flow rate can be determined by monitoring the pressure within the fuel cell system, one or more electrical characteristics of the fuel cell battery, or one or more electrical characteristics of an electronic appliance being supplied with power by the fuel cell battery. The control system can include one or more microprocessors, microcontrollers, circuits, switching devices, capacitors, sensing instruments, timers, DC-DC converters and combinations thereof.

The gas generator can be a stand-alone unit or can be integrated with a gas-consuming device. The gas generator includes a housing, at least a portion of which can be part of a gas-consuming system or that is a separate housing. The housing can include thermal insulation to protect the rest of the system and/or the user from heat produced within the hydrogen generator. The thermal desired insulation can be provided by the housing materials, a layer of insulation around exterior or the interior of the housing, space between the fuel unit(s) and the housing, or a combination thereof.

In order to make the fuel unit and the gas generator thin, it is desirable to minimize the volume of thermal insulation used. One way to help achieve this is to increase the number of quantities of fuel (e.g., with more pellets, each of a smaller size). It is also desirable to supply a minimum amount of energy into the fuel unit to initiate the gas generation in order to minimize the heat produced within the fuel unit, so as much heat as possible can be dissipated rather than contained, while still protecting both the user and components of the gas generator, the fuel consuming system and any device or appliance being used with the system.

The endo fuel is one that either reacts endothermically or does not react exothermically enough for the reaction to be self-sustaining after initiation in the fuel unit. The endo fuel used can be selected based on the gas to be produced as well as other characteristics of the material and the other products. One or a combination of materials can be used, and the endo fuel can be part of a composition including various additives. If the gas is hydrogen, examples of materials and combinations thereof include materials that can reversibly absorb and desorb hydrogen (e.g., metal-organic frameworks (MOFs), zeolites, graphene, carbon nanotubes and metal hydrides as $AB_5$ and $AB_2$ type hydrogen storage alloys such as titanium-manganese, mischmetal-nickel, lanthanum-nickel-cobalt and lanthanum-nickel alloys), materials that can react to produce hydrogen gas upon thermal decomposition (e.g., metal hydrides such as lithium hydride, magnesium hydride, and aluminum hydride (alane), complex hydrides and their ammonia adducts such as lithium borohydride, sodium borohydride, magnesium borohydride, calcium borohydride, ammine titanium (III) borohydride, lithium aluminum hydride, sodium aluminum hydride, lithium amide, and calcium aluminum hydride, and B—N chemical hydrides such ammonia borane and hydrazine borane), and various combinations including the above materials. A preferred endo fuel is alane, which decomposes to aluminum metal and hydrogen gas at about 180° C. Alane has a density of about 1.3 g/cm$^3$, and a composition including 10-weight percent binder can produce about 9-weight percent hydrogen gas by weight of the composition.

The exo fuel is a material or combination of materials that can provide an exothermic reaction (preferably a self-sustaining exothermic reaction), thereby reducing the total amount of energy that must be supplied to the initiators to produce the gas. The exo fuel can be selected based on factors such as the type of initiator to be used, the amount of energy and time required to initiate the exothermic reaction, the temperature required to initiate the release of gas from the endo fuel, the quantity of heat produced per unit of mass or volume of exo fuel, and the desired maximum temperature to be achieved. One or a combination of materials can be used, and the endo fuel can be part of a composition including various additives. In some cases the exo fuel may also produce some of the desired gas during the exothermic reaction, thereby adding to the total quantity of the gas that the fuel unit is able to generate. Examples of exo fuels include metal/metal oxide multilayers such as $Ti/Pb_3O_4$, $Zr/Fe_2O_3$, guanidinium borohydride, B—N compounds blended with oxidizers such as ammonium nitrate or $Sr(NO_3)_2$ as described in US2011/0027168A1, metal/metal multilayered thin films and structures such as Ni/Al as described in U.S. Pat. No. 7,867,441, autoignition compositions such as silver nitrate mixed with potassium nitrate and molybdenum metal as described in U.S. Pat. No. 6,749,702, complex hydride, oxidizer, and S compositions such as described in U.S. Pat. No. 7,964,111, and the compositions described in patents US2008/0236032A1 and US 2008/0241613A1. Other compositions include gels of metals and water such as Mg/water/poly(acrylamide-co-acrylic acid) alone or in combination with sodium borohydride (Varma, et al. *Chem. Eng. Sci* 2010, 65, 80-87 and *Int. J. Hydrogen En* 2007, 32, 207-211, respectively). The exo fuel composition can include one or more additives, to serve as a binder or to slow down the exothermic reaction (e.g., to prevent it from getting too hot or from being consumed before the associated quantity of endo fuel can be fully utilized for example. When used in a hydrogen generator, it can be advantageous if the exo fuel produces hydrogen, thereby increasing the total quantity of hydrogen gas that can be produced by the fuel unit. Preferred exo fuels that can be self-sustaining (i.e., release at least 80 volume percent of the theoretical amount of releasable hydrogen after initiation of the reaction) and also contribute to the total amount of hydrogen that is produced by a hydrogen generator include $LiAlH_4/B(OH)_3$ (e.g., in a 3:4 weight ratio), $LiAlH_4/Al(OH)_3$ (e.g., in a 2:1 weight ratio) and guanidinium borohydride (GBH)/$AlH_3$ with greater than 55 weight percent GBH.

Another example of an exo fuel is a laminate containing a plurality of alternating layers of two materials that can react exothermically upon application of a small pulse of local electrical energy. This is similar to the embodiment of the laminate used as an initiator described above, except that the laminate takes the place of another exo fuel and is used with an electrical initiator.

Additives that can be included in the composition containing the endo fuel or the exo fuel include binders, stabilizing compounds, thermally conduction materials, flow agents and catalysts. However, in order to provide the highest theoretical quantity of gas per fuel unit and to avoid unnecessary contaminants to the gas being generated, it is generally desirable to minimize the amount of additives.

Materials for the gas generator are selected to withstand the temperatures to which they will be exposed as well as to be compatible with the endo and exo fuels, reaction products and byproducts to which they will be exposed. Metals such as aluminum, steel and stainless steel, ceramics, and high temperature resistant polymers such as polyphenylene sulfide, acrylonitrile butadiene styrene, polyetheretherketone, polyetherimide, polyoxybenzylmethyleneglycol anhydride (Bakelite®), epoxies, phenolics, diallyl phthalate and melamine may generally be suitable for the hydrogen generator housing and other components that must be able to withstand high temperatures. When poor thermal conductivity is required, the material will have a thermal conductivity less than 5 watts/meter·Kelvin, preferably less than 2 watt/meter·Kelvin and most preferably less than 1 watt/meter·Kelvin).

The materials listed above for the gas generator may also be suitable for at least portions of the fuel unit housing. Poor thermal conductivity is generally desired, to protect other components of the gas generator as well as help prevent burns a used fuel unit is removed. High temperature polymers such as polyetheretherketone, polyimides, phenolics and derivatives thereof are generally suitable.

The conductive sections preferably have a thermal conductivity greater than 100 watts/meter·Kelvin. Examples of suitable materials include a graphite based material (e.g., GRAFOIL®, made by GrafTech) and a metal (e.g., aluminum, steel, stainless steel, copper or a combination or alloy thereof).

Examples of thermal insulation that can be used to separate fuel pellets or be used elsewhere in the fuel unit or hydrogen generator to provide additional insulation include silica, silicon dioxide, silicon nitrides, silicon carbide, silica aerogel, calcium silicate, alumina, aluminum oxide, glass, glass wool, mineral wool, cellular glass, perlite, and polymers such as polyimides and epoxy-amine composites.

Examples of materials that may be suitable for filters include silica, silicon dioxide, silicon nitrides, silicon carbide, silica aerogel, alumina, aluminum oxide, glass, glass wool, mineral wool, cellular glass, microfiber glass (e.g., with a fiber diameter less than 6 μm), perlite and polymers such as porous polytetrafluoroethylene membranes, polyimides, polyetheretherketone, and epoxy-amine composites, as well as suitable gas purification units (such as ion exchange resins). It may be possible to select and position filters to also provide thermal insulation.

A control system can be used to supply energy to the initiators, control the rate and amount of gas generated, and or the gas flow rate from the hydrogen generator. In a fuel cell system, the control system can determine the need for hydrogen and/or the required hydrogen flow rate by monitoring the pressure within the fuel cell system, one or more electrical characteristics of the fuel cell stack, or one or more electrical characteristics of the electronic device, for example. The controller may communicate with the device or the fuel cell stack to determine when more hydrogen is needed. The control system can be completely or partially disposed in the hydrogen generator, the fuel cell stack, the electronic device being powered by the fuel cell stack, or any combination thereof. The control system can include a microprocessor or micro controller; digital, analog and/or hybrid circuitry; solid state and/or electromechanical switching devices; capacitors, sensing instrumentation, timers, DC-DC converters, and so on. The same or a different control system can also be used for other purposes, such as identifying hydrogen generators and fuel units that are appropriate or approved for use, preventing use of inappropriate or unapproved hydrogen generators and fuel units, controlling charging of batteries in the fuel cell system and the device by the fuel cell battery, calculating and providing information on the remaining capacity of the fuel unit(s), recording historical information regarding the use of fuel units, the hydrogen generator, the fuel cell system and the device, preventing operation of the hydrogen generator under unsafe conditions, and other purposes.

Figure 1:
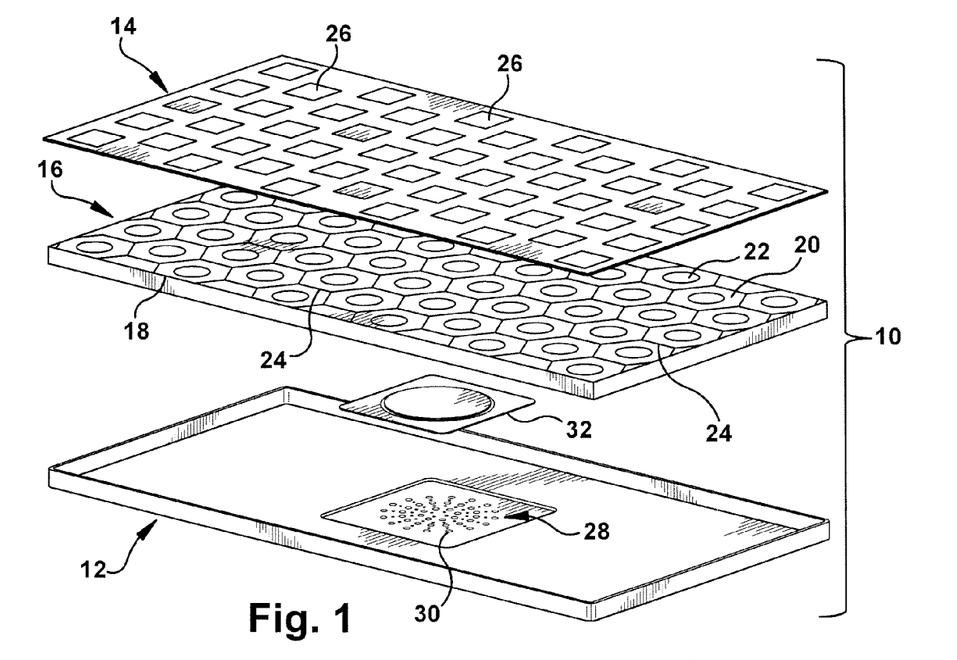
FIG. 1 is an exploded perspective view of an embodiment of a fuel unit for a gas generator.

An exploded view of an embodiment of a fuel unit for a gas generator is shown in FIG. 1. The fuel unit 10 includes a housing with a base 12 and a lid 14 enclosing an array 16 of pellets 18, each pellet 18 including a composition 20 containing an endo fuel and a composition 22 containing an exo fuel. The pellets 18 are segregated from each other by thermal insulation 24. The lid 14 includes an array of thermally conductive sections 26 aligned with corresponding pellets 18 in array 16. The base 12 has a gas outlet 28, which can include a plurality of openings 30. Disposed over the outlet 28 is a filter 32. To provide a portion of a gas flow path from the pellets 18 to the filter 32 and outlet 28, projections or grooves (not shown) can be provided on the inner surfaces of the housing. The thermal insulation 24 separating the pellets 18 can be porous or grooved or include projections to provide a portion of the gas flow path. In addition or alternatively, porous material (not shown) can be disposed between the array 16 of pellets 18 to provide a portion of a gas flow path. As described above, thermally conductive sections 26 are used with thermal initiators, electrically conductive sections 26 are used with electrical initiators, and inward projecting conductive members can be used as alternatives to the conductive sections 26 shown in FIG. 1.

The fuel unit 10 in FIG. 1 can be modified in various ways, as described above. For example, the pellets 18 in FIG. 1 have a hexagonal shape, but they can have other shapes, such as rectangular or square as shown in the embodiment in FIG. 3. In FIG. 1 the exo fuel composition 22 is shown as a coating on the endo fuel composition 20. However, the exo fuel composition 22 can extend into the endo fuel composition 20, either partially or completely to the opposite surface of the pellet 18, a larger or smaller area of each pellet can be coated with the exo fuel composition 22, or the pellets can include a composition containing a mixture of the endo and exo fuels. The fuel unit 10 has a single layer of pellets 18, but multiple units could be used. For example, two or more arrays 16 could be stacked, with both the base 12 and the lid 14 having an array of conductive sections 26, such that the thermally conductive sections 26 on the lid 14 are aligned with the pellets 18 in the top array 16 and the conductive sections 26 on the base 12 are aligned with the pellets 18 in the bottom array 16. Although the fuel unit 10 is shown in FIG. 1 having individual pellets 18 separated by thermal insulation 24, quantities of the endo fuel composition 20 do not have to be physically segregated, as described above. The filter 32 and gas outlet 28 could be relocated to another part of the housing if desired, such as on one or more of the housing edges.

Figure 2:
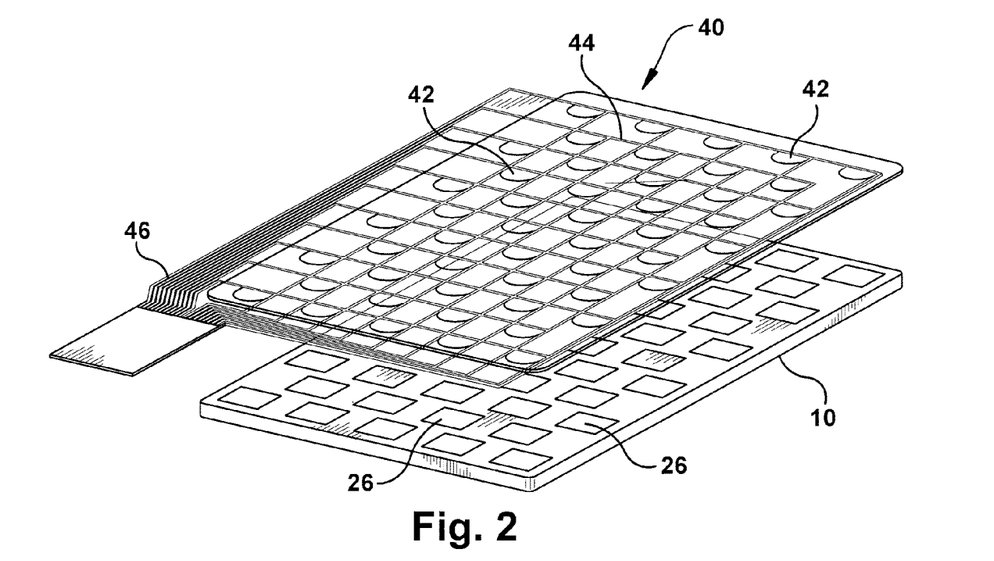
FIG. 2 is a perspective view of the fuel unit of FIG. 2 and a portion of a gas generator.

FIG. 2 shows a fuel unit 10, such as the one in FIG. 1, and a portion of the hydrogen generator in an exploded view. The hydrogen generator has an initiator assembly 40 including an array of initiators 42 on a support member 44 (translucent in FIG. 2 to show the initiators 42 on the inside surface of the support member 44) and an electrical circuit 46 in electrical communication with an energy source (not shown). The array of initiators 42 is aligned with the array of conductive sections 26 in the fuel unit 10. When the fuel unit 10 is installed in the hydrogen generator each individual initiator 42 is in contact with the corresponding conductive section 26, and energy is provided through the selected initiator 42 and conductive section 26 to the corresponding pellet 18, and the exo fuel composition 22 in that pellet 18 is initiated. The circuit 44 includes an X-Y grid of wires, each wire connected to a row of initiators 42 in either the X or Y direction. The circuit 46 provides electrical connections between each of the initiators 42 and both terminals of the energy source. Electric energy can be provided to any individual initiator 42 by energizing the two wires connecting that initiator 42 to the energy source. A control system can be used to control the energizing of each of the initiators 42 such that only the desired individual initiator(s) 42 are energized to only initiate the exo fuel compositions 22 in the corresponding pellet(s) 18, and limit the duration of energizing the initiators 42 to that required to initiate the exothermic reaction.

Figure 3:
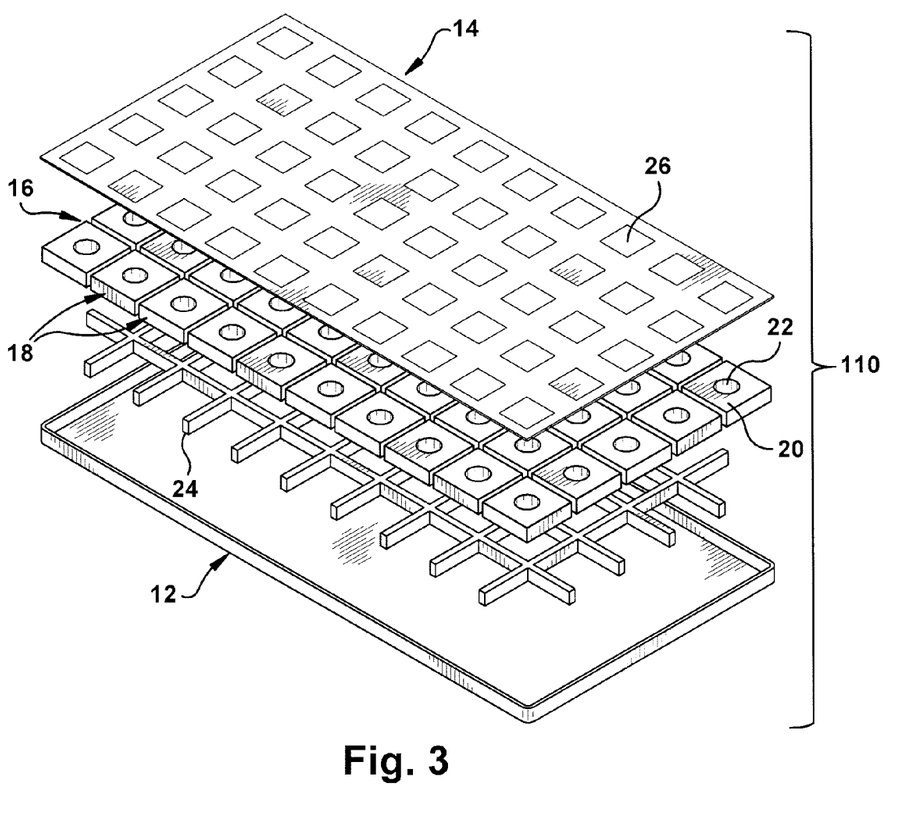
FIG. 3 is an exploded perspective view of a second embodiment of a fuel unit for a gas generator.

FIG. 3 is an exploded view of a fuel unit 110 in which the pellets 18 have a square shape. Components of the fuel unit 110 are indicated with the same reference numbers as the corresponding components in fuel unit 10 in FIG. 1. Because the pattern of the array of conductive sections 26 in fuel unit 110 is not identical to pattern in fuel unit 10, the pattern of the initiators 42 as shown in FIG. 2 would have to be modified to match. Otherwise, the structure and operation of a hydrogen generator using fuel unit 110 can be the same as described above with reference to FIGS. 1 and 2, and fuel unit 110 can also be otherwise modified as described above.

Figure 4:
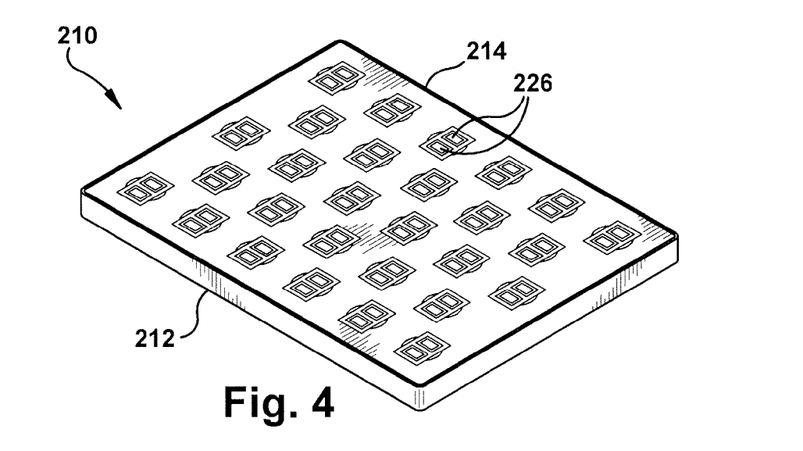
FIG. 4 is a perspective view of a third embodiment of a fuel unit for a gas generator.
Figure 5:
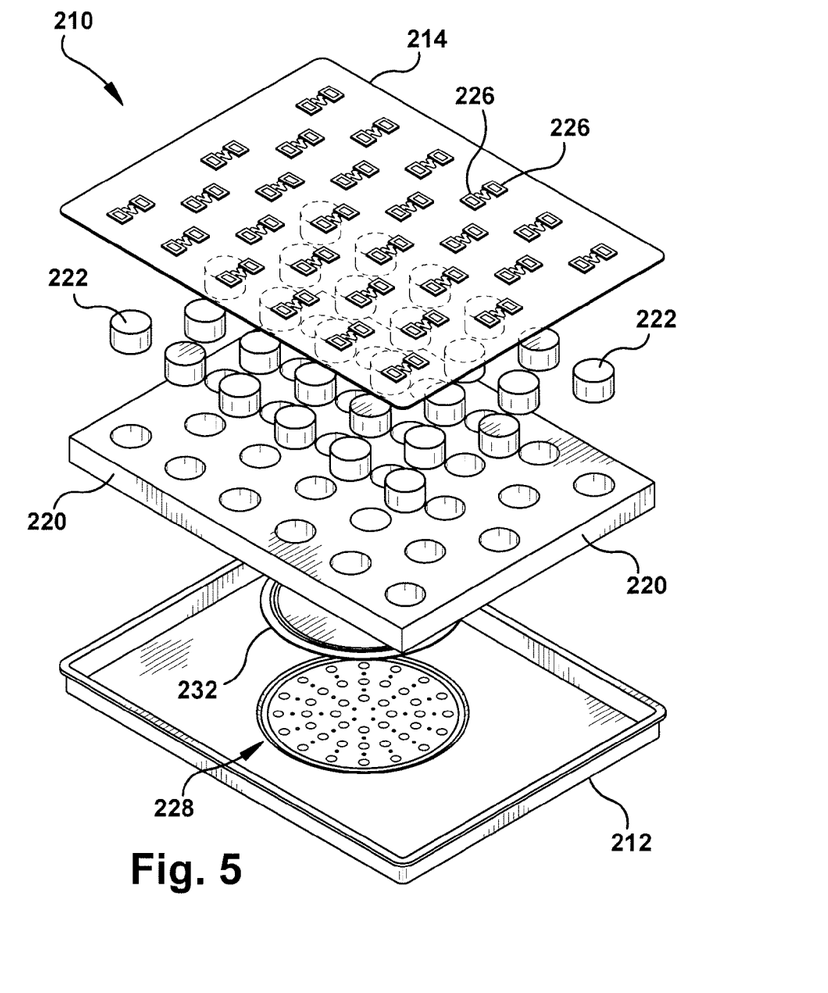
FIG. 5 is an exploded perspective view of the fuel unit in FIG. 4.

Another embodiment of a fuel unit is shown in FIGS. 4 and 5. Fuel unit 210 includes a base 212 and a lid 214. The lid 214 has a plurality of pairs 225 of electrically conductive sections 226. Each pair 225 provides electrical contacts for an electrically operated initiator inside the fuel unit 210. The initiators can be resistive heating elements or Ni/Al laminate initiators inside the lid 214 for example. As depicted in FIG. 5, inside the fuel unit 210 is an unsegregated endo fuel composition 220. No thermal insulation segregates quantities of the endo fuel composition 220. In other implementations insulation could be added as shown in the embodiments in FIGS. 1 and 3. Quantities of an exo fuel composition 222 are associated with quantities of the unsegregated endo fuel composition 220 such that each of the quantities of the exo fuel composition 222 can provide the heat necessary to release gas from the corresponding quantity of unsegregated endo fuel composition. As shown in FIG. 5 the quantities of exo fuel composition 222 are disposed partially within, and in direct contact with, the unsegregated endo fuel composition 220 to provide more efficient heating. Fuel unit 210 also includes a filter 232 covering a gas outlet 228 in the base 212.

Figure 6A:
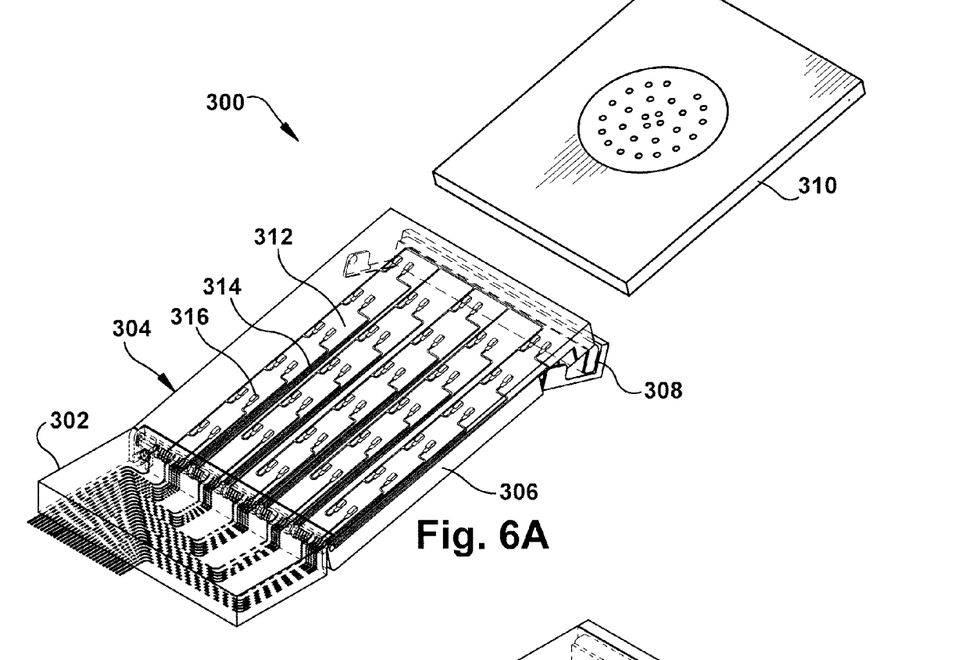
FIG. 6A is a perspective view of a fuel unit, a gas generator into which the fuel unit can be used, and gas consuming device connected to the holder, with the holder open.
Figure 6B:
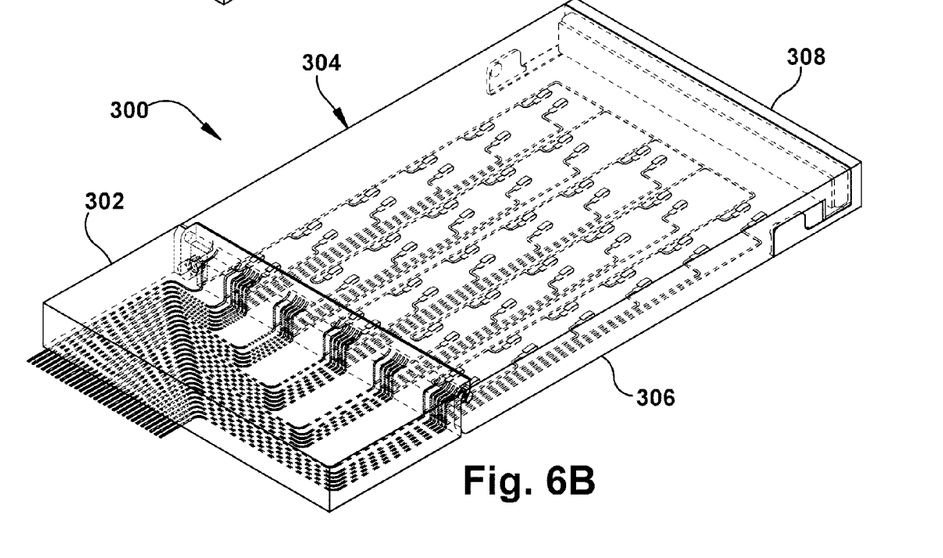
FIG. 6B is a perspective view of the fuel unit and gas generator in FIG. 6A, with the gas generator closed.
Figures 7, 8:
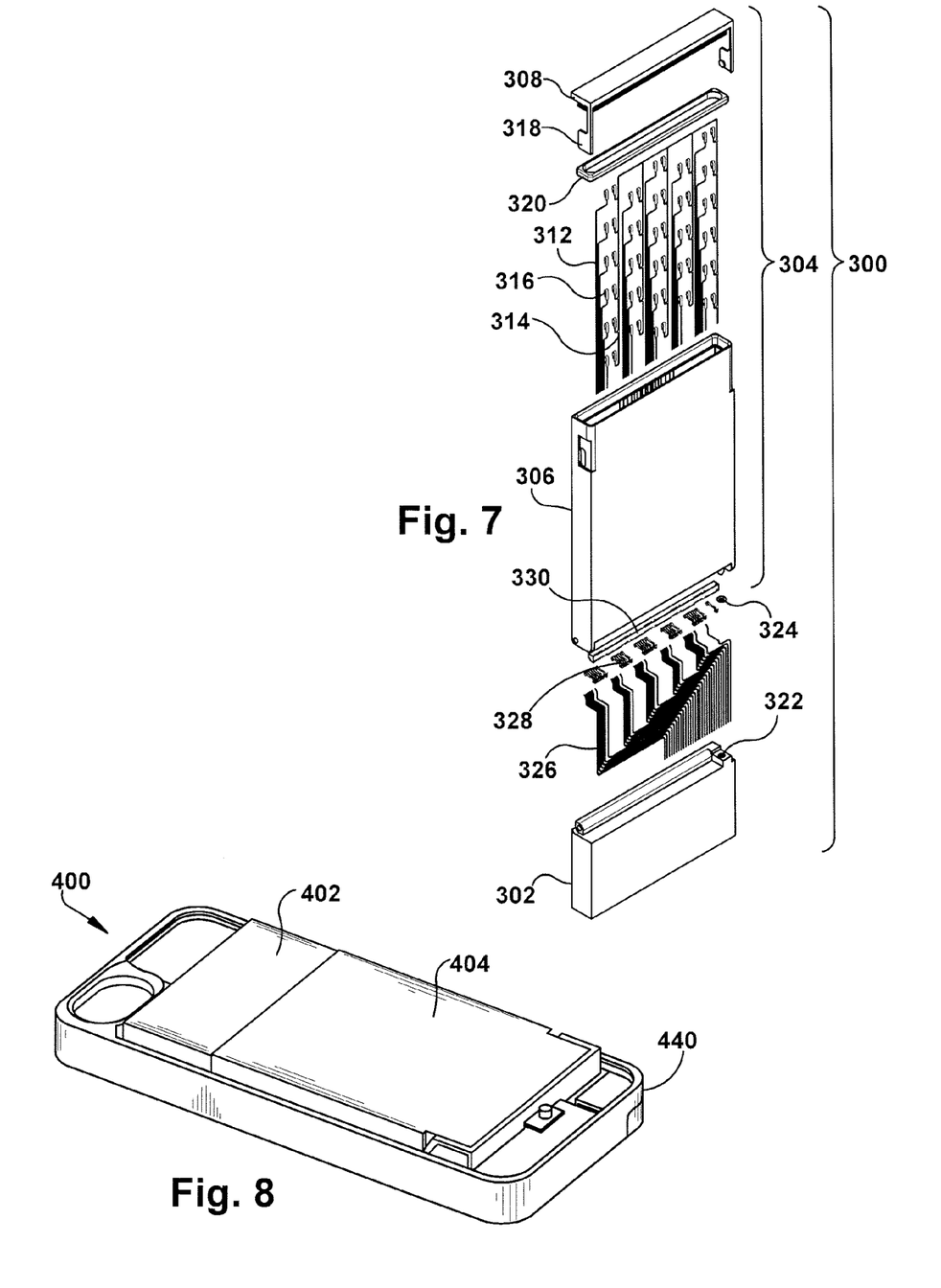
FIG. 7 is an exploded perspective view of the gas generator and gas consuming device in FIGS. 6A and 6B.
FIG. 8 is an embodiment of a portion of portion of an electric appliance containing a fuel cell system.

FIGS. 6A and 6B show an embodiment of a system 300 including a gas consuming device 302 and a gas generator 304 that uses a fuel unit 310. The fuel unit 310 can have a design similar to any of those in FIGS. 1 to 5, or it can be different. In FIGS. 6A and 6B, the top portion of the gas generator 304 is not shown to better show other components. The gas generator 304 is shown in an open configuration in FIG. 6A and a closed configuration in FIG. 6B. In the open configuration, the gas generator 304 is tilted upward with respect to the gas consuming device 302, to allow insertion of the fuel unit 310 when the system is installed in an appliance, as explained below. The gas generator 304 includes a housing 306 and a door 308 that can be opened (FIG. 6A) to insert and remove the fuel unit 310. An exploded view of the system 300 is shown in FIG. 7.

The gas generator 304 includes a support member 312 on which an electrical circuit 314 including a plurality of pairs of electrical contacts 316 is disposed. Each pair of electrical contacts 316 is aligned with a corresponding pair of electrically conductive sections (contacts) in the fuel unit 310 when the fuel unit 310 is disposed within the housing 306. The circuit 314 provides electric energy to initiators in the fuel unit 310. The electrical contacts 316 can be biased or moved against the corresponding electrically conductive sections of the fuel unit 310 when the fuel unit 310 is in the gas generator 304, either individually or along with the support member 312. The door 308 is mounted to the housing 306 with mounts 318 such that the door 308 can be slid outward and pivoted with respect to the housing 306 to provide clearance for insertion and removal of the fuel unit 310. A gasket 320 provides an air-tight seal between the door 308 and the housing 306 when the gas generator is in the closed configuration. On the end of the housing 306 opposite the door 308, a gas outlet (not shown) is provided to a corresponding gas inlet 322 in the gas consuming device 302, with an o-ring 324 to provide a seal between the gas outlet and the gas inlet 322. The housing 306 is preferably pivotably connected to the gas consuming device 302 to allow the gas generator 304 to be pivoted, as shown in FIG. 6A.

Electric energy for operating the initiators is provided from an external source (not shown) via a circuit 326 in the system 300, and circuit 326 is connected to the circuit 314 in the gas generator 304. This connection is made by pivot contact connectors 328 on a contact connector mount on the gas generator housing 306, to maintain electrical contact between circuits 326 and 314 when the gas generator 304 is pivoted with respect to the gas consuming device 302.

An embodiment of a system including a gas generator and a fuel consuming device is a fuel cell system. An example is the fuel cell system 400 shown in FIG. 8 and including a fuel cell battery 402 and a hydrogen generator 404. Hydrogen generator 404 can have a design similar to the gas generator 304 in FIGS. 6A, 6B and 8. As shown in FIG. 8, the fuel cell system 400 is contained in a portion 440 of an electric appliance that can be powered by the fuel cell battery 402. The hydrogen generator 404 is in a closed configuration in FIG. 8, similar to the closed configuration of the gas generator in FIG. 6B, and in this configuration there is insufficient clearance to open the door of the hydrogen generator 404 and insert or remove a fuel unit. As in system 300, the hydrogen generator 404 can be pivoted with respect to the fuel cell battery 402 to allow the hydrogen generator door to be opened and fuel units exchanged.

EXAMPLE

In an example of a fuel unit, alane is used as the endo fuel, a laminate material containing nickel and aluminum is used as the exo fuel, and hydrogen gas is generated when the alane is heated. The endo fuel composition includes about 90 weight percent alane and about 10 weight percent binder and preferably has an initial thermal conductivity of about 1 W/m·° K. The exo fuel includes nickel and aluminum in a laminate with alternating layers of nickel and aluminum or a composite of particles or powders including nickel and aluminum. The fuel unit includes a layer of endo fuel, which can be formed on a substrate, such as a portion of the fuel unit package or an intermediate material, preferable one with a thermal conductivity no greater than 0.3 W/m·° K. The exo fuel is arranged in segregated quantities that are partially disposed below the outer surface of the endo fuel layer, with a portion of the exo fuel exposed at the surface of the endo fuel layer. Electrical energy is selectively applied to the exposed portions of the individual quantities of the exo fuel via a pair of electrical contacts connected to an external source of electrical power. The fuel unit is contained within a package made of PEEK and having a hydrogen outlet. If necessary, thermal insulation can be added inside the package to maintain the temperature the package is exposed to below 300° C. The desired exo fuel has an energy density is at least 2 Whr/cm$^3$ (7.2 kJ or 1.7 kcal), and an actual density of at least 1 g/cm$^3$, an initiation temperature no greater than about 280° C., and require no more than 2 seconds at the initiation temperature to initiate the exothermic reaction.

All references cited herein are expressly incorporated herein by reference in their entireties. To the extent publications and patents or patent applications incorporated by reference contradict the disclosure contained in the present specification, the present specification is intended to supersede and/or take precedence over any such contradictory material.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

What is claimed is:

1. A fuel unit for a gas generator comprising a housing containing a solid fuel composition and a heat producing material, wherein:
   the solid fuel composition comprises a gas releasing solid material that can react to release hydrogen gas when heated;
   the heat producing material can react exothermically to produce heat;
   a plurality of quantities of the heat producing material are disposed in thermal communication with corresponding portions of an unsegregated quantity of the solid fuel composition such that, following initiation of a reaction of each quantity of the heat producing material, the quantity of heat producing material will heat the corresponding portion of the unsegregated quantity of the solid fuel composition, and the corresponding portion of the unsegregated quantity of the solid fuel composition will react to release a quantity of the hydrogen gas;
   the gas releasing solid material comprises alane;
   the heat producing material comprises one or more of LiAlH$_4$/B(OH)$_3$, LiAlH$_4$/Al(OH)$_3$, and (GBH)/AlH$_3$; and
   the plurality of quantities of the heat producing material are disposed partially within and in direct contact with the unsegregated quantity of the solid fuel composition.

2. The fuel unit according to claim 1, wherein the gas-releasing solid material will not undergo a self-sustaining exothermic reaction following initiation of a gas releasing reaction.

3. The fuel unit according to claim 1 wherein the heat producing material comprises LiAlH$_4$/B(OH)$_3$.

4. The fuel unit according to claim 1, wherein the heat producing material comprises LiAlH$_4$/Al(OH)$_3$.

5. The fuel unit according to claim 1, wherein the heat producing material comprises (GBH)/AlH$_3$.

6. The fuel unit according to claim 1, wherein the housing comprises a plurality of conductive sections for conducting one of heat and electric energy through the housing.

7. The fuel unit according to claim 6, wherein the fuel unit comprises a plurality of initiators for initiating the reaction of the heat-producing material in the plurality of quantities of the heat producing material.

8. The fuel unit according to claim 7, wherein the initiators are disposed within the housing.

9. The fuel unit according to claim 7, wherein the initiators are disposed outside the housing.

10. The fuel unit according to of claim 7, wherein the initiators comprise at least one thermal initiator.

11. The fuel unit according to claim 7, wherein the initiators comprise at least one electrical initiator.

12. The fuel unit according to claim 1, wherein the fuel unit comprises a plurality of the unsegregated quantities of the solid fuel composition.

13. The fuel unit of claim 1, wherein the reaction of the heat producing material in the plurality of quantities of heat producing material is selectively initiated to selectively release the hydrogen gas from the corresponding portions of the solid fuel composition.

14. A gas generator, comprising:
    a first housing;
    a plurality of fuel units, each comprising:
        a second housing containing a solid fuel composition and a heat producing material, wherein the solid fuel composition comprises a gas releasing solid material that can react to release hydrogen gas when heated;
        wherein the heat producing material can react exothermically to produce heat;
        a plurality of quantities of the heat producing material are disposed in thermal communication with corresponding portions of an unsegregated quantity of the solid fuel composition such that, following initiation of a reaction of each quantity of the heat producing material, the quantity of heat producing material will heat the corresponding portion of the unsegregated quantity of the solid fuel composition, and the corresponding portion of the unsegregated quantity of the solid fuel composition will react to release a quantity of the hydrogen gas; and,
    an energy source for supplying electric energy for initiation of the reaction of the quantities of heat producing material;
    wherein the gas releasing solid material comprises alane;

wherein the heat producing material comprises one or more of $LiAlH_4/B(OH)_3$, $LiAlH_4/Al(OH)_3$, and $(GBH)/AlH_3$; and wherein the plurality of quantities of the heat producing material are disposed partially within and in direct contact with the unsegregated quantity of the solid fuel composition.

15. The gas generator of claim 14 wherein the gas-releasing solid material will not undergo a self-sustaining exothermic reaction following initiation of a gas releasing reaction.

16. The gas generator of claim 14 wherein each fuel unit is in a separate first housing.

\* \* \* \* \*